United States Patent Office 3,700,471
Patented Oct. 24, 1972

3,700,471
GLASS-CERAMIC ARTICLES
David A. Duke, Corning, N.Y., assignor to
Corning Glass Works, Corning, N.Y.
No Drawing. Filed Nov. 12, 1970, Ser. No. 89,111
Int. Cl. C03c 3/22, 3/10; C04c 35/00
U.S. Cl. 106—39 DV       1 Claim

ABSTRACT OF THE DISCLOSURE

This invention relates to the manufacture of glass-ceramic articles in the $PbO-Al_2O_3-SiO_2$ composition field utilizing $TiO_2$ and/or $ZrO_2$ plus $P_2O_5$ as nucleating agents. Alpha-cristobalite comprises the predominant crystal phase when the silica content of the articles is at a high level whereas lead feldspar constitutes the predominant crystal phase when the lead oxide content of the article is at a high level. At intermediate concentrations of PbO and $SiO_2$, the final crystallization will be a mixture of these two phases.

---

Glass-ceramic articles are produced through the controlled crystallization of glass articles. An extensive discussion of the manufacturing techniques, the structure of the articles, and the theoretical considerations involved in the production of glass-ceramic articles is set out in U.S. Pat. No. 2,920,971 and reference is hereby made to that patent. In general terms, however, the manufacture of glass-ceramic articles contemplates three principal steps: (1) a glass-forming batch to which a nucleating agent is commonly added is melted; (2) the melt cooled sufficiently rapidly to form a glass article; and (3) the glass article is subjected to a defined heat treatment such that relatively uniformly-sized, fine-grained crystals homogeneously dispersed in a glassy matrix are crystallized in situ. The amount of crystallization is such that the glass-ceramic article is predominantly crystalline, i.e., greater than 50% by weight crystalline. Ordinarily, the heat treatment comprises two stages: (1) the glass article is heated at a temperature above the transformation range of the glass but below the softening point thereof to cause the development of nuclei therein; and (2) the nucleated article is heated to a temperature above the softening point of the glass to expedite the growth of crystals on the nuclei.

Inasmuch as a glass-ceramic article is produced through the crystallization in situ of a glass article, the final product is free from voids and non-porous. And, since a glass-ceramic article is more crystalline than glass, the physical and chemical properties thereof will be more characteristic of the crystal phase than of the parent glass. Finally, as can be appreciated, the residual glassy matrix will have a far different composition from that of the original glass article since the crystal components will have been precipitated out.

I have discovered that certain glasses of high silica content in the $PbO-Al_2O_3-SiO_2$ composition field, when nucleated with $TiO_2$ and/or a combination of $ZrO_2+P_2O_5$, can be crystallized in situ to yield a glass-ceramic article having coefficients of thermal expansion ranging between about $150-200 \times 10^{-7}$ per ° C., and having the capability of exhibiting very high strength when coated with a low expansion glaze. I have also discovered that certain glasses in the same general composition field but having a higher PbO content can be crystallized in situ to glass-ceramic articles exhibiting coefficients of thermal expansion between about $40-70 \times 10^{-7}/$° C. thereby rendering them especially suitable for coating and bonding with such refractory metals as tantalum, tungsten, molybdenum, and alloys thereof.

In broad outline, my invention comprises melting a batch for a glass consisting essentially, by weight on the oxide basis, of about 10–45% PbO, 10–25% $Al_2O_3$, 35–65% $SiO_2$, and a nucleating agent selected from the group consisting of 6–12% $TiO_2$ and/or 3–10% $ZrO_2+5-15\%$ $P_2O_5$, said nucleating agent not exceeding about 23% of the total composition. The melt is simultaneously cooled to at least below the transformation range thereof and a glass body shaped therefrom. The glass body is thereafter heated to a temperature between about 700°–1200° C. for a period of time sufficient to attain the desired crystallization in situ. The transformation range is that temperature at which a liquid melt is considered to have been converted into an amorphous solid, this temperature normally being deemed to lie between the strain point and the annealing point of a glass. My preferred heat treatment practice contemplates a two-step procedure wherein the glass article is initially heated to temperatures somewhat above the transformation range, i.e., about 700°–850° C., and held thereat for a sufficient length of time to assure satisfactory nucleation and to begin crystal growth. Thereafter, the article is heated to about 900°–1200° C. and maintained thereat for a sufficient period of time to complete crystal growth. Inasmuch as the crystallization step is a time-temperature dependent process, it can readily be understood that at temperatures within the higher extreme of the crystallization range only brief dwell periods will be required, e.g., about ¼ hour or even less; whereas, at the cooler end of the crystallization range, maintenance times as long as 24–28 hours may be necessary to achieve extensive crystallization.

It will be appreciated that numerous modifications in the manufacturing process are possible. For example, when the melt is quenched and shaped to a glass article, the article may be cooled to room temperature for visual inspection of the glass quality prior to initiating the heat treating step. Nevertheless, where speed in production and fuel economies are sought, the melt may merely be quenched to a glass shape at a temperature just below the transformation range and the heat treatment thereof begun immediately. Also, although a two-step heat treatment cycle is preferred, a very satisfactory product can be obtained when the glass article is simply heated from room temperature or the transformation range to temperature within 700°–1200° C. range and held thereat for a sufficient length of time to develop the extensive crystallization desired. Further, if the rate of heating is relatively slow and the final crystallization temperature is near the upper extreme of the heat treating range, no dwell period, as such, at any one temperature will be required. However, since the growth of crystals is dependent upon time and temperature, the rate of heating the glass article above the transformation range must not be so rapid as to prevent the growth of sufficient crystals to support the article, thereby leading to consequent deformation and slumping of the article. Hence, whereas heating rates of 10° C. per minute and higher have been employed successfully, particularly where physical supports were provided for the glass articles, I prefer a rate of about 3°–5° C./minute. These heating rates have yielded articles exhibiting very little, if any deformation throughout the group of compositions comprising this invention.

In my preferred two-step heat treatment procedure, a dwell time of about 1–6 hours within the nucleation range followed by a crystal growth period of about 1–8 hours within the crystallization temperature range is normally utilized.

Table I records compositions, expressed in weight percent on the oxide basis, of thermally crystallizable glasses which were heat treated to produce uniformly fine-grained glass-ceramic articles. The batch ingredients may comprise any materials, either oxides or other compounds which, on being melted together, are transformed to the desired oxide compositions in the proper proportions. The batch ingredients were compounded, ballmilled together to aid in obtaining a homogeneous melt, and thereafter melted in open platinum crucibles for about 16 hours at temperatures between about 1500°–1600° C. Glass cane samples of about ¼" diameter were drawn from each melt and the remainder poured onto a steel plate to give a circular patty about 5" in diameter and ½" thick. The glass articles were immediately transferred to an annealer operating at 600° C. Following the annealing cycle, the glass articles were placed in an electrically-fired furnace and exposed to the heat treatment schedules reported in Table II. At the conclusion of the heat treating step, the current to the furnace was cut off and the crystallized articles were either taken out directly into the ambient atmosphere or merely left in the furnace and permitted to cool to room temperature within the furnace. The furnace rate of cooling was estimated to average about 3°–5° C./minute.

Although the above-recited quantities of PbO, $Al_2O_3$, $SiO_2$, and nucleating agent are demanded to secure a glass-ceramic article wherein the crystal phase consists essentially of alpha-cristobalite and/or lead feldspar $$(PbO \cdot Al_2O_3 \cdot 6SiO_2)$$

and exhibiting a coefficient of thermal expansion ranging between about $40-200 \times 10^{-7}/°C.$, depending upon the relative proportions of the two primary crystal phases in the crystallized product, minor amounts of compatible metal oxides up to a total of about 15% by weight may be included to aid in melting the batch, forming the melt, or modifying the chemical and physical properties of the final article. Such additions as $B_2O_3$, $Na_2O$, $K_2O$, CaO, and SrO appear to inhibit the crystal growth so are desirably present in amounts totalling less than 5% by weight. The inclusion of $Li_2O$ to the high silica compositions leads to the growth of low expansion beta-eucryptite or beta-spodumene crystals which are not claimed as part of this invention. Therefore, $Li_2O$ is preferably absent from the compositions and can only be tolerated in amounts less than about 2% by weight. The inclusion of ZnO and MgO can result in the crystallization of gahnite ($ZnO \cdot Al_2O_3$) and spinel ($MgO \cdot Al_2O_3$), respectively and amounts up to about 10% by weight total of these oxides can be employed. The development of the feldspar phase is substantially benefited through the presence of BaO. Therefore, amounts up to 15% may be added, particularly in those glass compositions where the lead oxide concentration is at a low level and the feldspar phase is desired.

In general, I have discovered that where the PbO content of the glass composition is below about 25% by weight, alpha-cristobalite will constitute the vast bulk of the crystallization unless some mineralizer such as BaO is included in the composition to promote the crystallization of a feldspar structure. In glasses where PbO comprises more than about 25% by weight, with or without a mineralizer, the crystallization of the product will consist essentially of the lead luminosilicate phase.

The melts resulting from the glasses of Table I are quite fluid and no fining agent was required. However, a conventional fining agent such as $As_2O_3$ may be added as desired.

TABLE I.—PERCENTAGES

|        | 1     | 2     | 3     | 4     | 5     | 6     | 7     | 8     | 9     | 10    | 11    | 12    | 13    |
|--------|-------|-------|-------|-------|-------|-------|-------|-------|-------|-------|-------|-------|-------|
| $SiO_2$ | 58.04 | 37.04 | 58.04 | 50.92 | 46.30 | 37.04 | 37.04 | 50.00 | 40.91 | 38.63 | 36.00 | 41.69 | 36.36 |
| $Al_2O_3$ | 13.40 | 18.51 | 13.40 | 13.89 | 18.51 | 18.51 | 13.89 | 13.64 | 20.90 | 18.18 | 18.00 | 18.51 | 16.37 |
| PbO    | 17.86 | 32.40 | 13.40 | 18.51 | 18.51 | 23.16 | 27.78 | 18.18 | 21.82 | 20.90 | 26.00 | 32.40 | 38.18 |
| $TiO_2$ | 10.70 | 7.40  | 10.70 | 3.70  |       |       |       | 1.82  | 9.09  | 9.09  | 10.00 | 7.40  | 9.09  |
| $ZrO_2$ |       |       |       | 3.70  | 7.40  | 7.40  | 7.40  | 7.27  |       |       |       |       |       |
| $P_2O_5$ |       |       |       | 9.28  | 9.28  | 13.89 | 13.89 | 9.09  |       |       |       |       |       |
| ZnO    |       |       |       |       | 4.65  |       |       |       |       |       |       |       |       |
| BaO    |       | 4.65  |       |       |       |       |       |       | 7.20  | 13.20 | 10.00 |       |       |

Table II records the heat treatment schedule to which each example was subjected, a visual description of each crystallized article, a measurement of the coefficient of thermal expansion (25°–300° C.), and the crystal phases present as determined by X-ray diffraction analysis.

TABLE II

| Example No. | Heat treatment | Description | Crystal phases | Coeff. exp. ($\times 10^{-7}/°$ C.) |
|---|---|---|---|---|
| 1 | Heat to 850° C. at 300° C./hr.; hold for 2 hours; heat to 1150° C. at 300° C./hr.; hold for 2 hours; cool at furnace rate. | White, finely crystalline | Cristobalite, rutile | |
| 2 | Heat to 850° C. at 300° C./hr.; hold for 2 hours; heat to 1150° C. at 300° C./hr.; hold for 3 hours; cool at furnace rate. | ——do—— | Lead feldspar | 6 |
| 3 | Heat to 800° C. at 300° C./hr.; hold for 2 hours; heat to 1100° C. at 300° C./hr.; hold for 4 hours; cool at furnace rate. | ——do—— | Cristobalite, gahnite, rutile | 202 |
| 4 | Heat to 850° C. at 300° C./hr.; hold for 2 hours; heat to 1100° C. at 300° C./hr.; hold for 2 hours; cool at furnace rate. | White, very finely crystalline | Cristobalite, cubic $ZrO_2$ | |
| 5 | Heat to 850° C. at 300° C./hr.; hold for 4 hours; heat to 1050° C. at 100° C./hr.; hold for 4 hours; cool at furnace rate. | ——do—— | Cristobalite, cubic $ZrO_2$ baddeleyite. | 146 |
| 6 | Heat to 850° C. at 300° C./hr.; hold for 4 hours; heat to 1100° C. at 100° C./hr.; hold for 4 hours; cool at furnace rate. | White, finely crystalline | Cristobalite | |
| 7 | Heat to 850° C. at 300° C./hr.; hold for 4 hours; heat to 1100° C. at 100° C./hr., hold for 4 hours; cool at furnace rate. | ——do—— | | |
| 8 | Heat to 800° C. at 300° C./hr. hold for 4 hours; heat to 1050° C. at 100° C./hr.; hold for 2 hours; cool at furnace rate. | White, very finely crystalline | Cristobalite | |

TABLE II—Continued

| Example No. | Heat treatment | Description | Crystal phases | Coeff. exp. ($\times 10^{-7}$/° C.) |
|---|---|---|---|---|
| 9 | Heat to 850° C. at 300° C./hr.; hold for 2 hours; heat to 1100° C. at 300° C./hr.; hold for 2 hours; cool at furnace rate. | White, finely crystalline | | |
| 10 | Heat to 800° C. at 300° C./hr.; hold for 2 hours; heat to 1100° C. at 100° C./hr.; hold for 2 hours; cool at furnace rate. | ___do___ | | |
| 11 | Heat to 850° C. at 300° C./hr.; hold for 2 hours; heat to 1150° C. at 300° C./hr.; hold for 2 hours; cool at furnace rate. | Gold-white, finely crystalline | Barium-lead feldspar | 43 |
| 12 | Heat to 850° C. at 300° C./hr.; hold for 2 hours; heat to 1060° C. at 300° C./hr.; hold for 2 hours; cool at furnace rate. | White, finely crystalline | | |
| 13 | Heat to 800° C. at 300° C./hr.; hold for 2 hours; heat to 1000° C. at 100° C./hr.; hold for 2 hours; cool at furnace rate. | ___do___ | | |

Tables I and II amply demonstrate the composition and process parameters for producing glass-ceramic articles exhibiting coefficents of thermal expansion ranging about $40$–$200 \times 10^{-7}$ per ° C. and containing alpha-cristobalite and/or lead feldspar as the principal crystal phase. Where the crystal phase consists essentially of alpha-cristobalite, the coefficient of thermal expansion of the glass-ceramic articles ranges about $150$–$200 \times 10^{-7}$/° C. whereas, when the crystal phase consists essentially of lead feldspar, the coefficient of thermal expansion of the articles ranges about $40$–$70 \times 10^{-7}$/° C. The crystal content of the articles is greater than about 50% by weight and normally exceeds about 75% by weight, depending upon the extent to which the components of the batch are adaptable to the formation of crystal phases. The crystals, themselves, are reasonably uniformly fine-grained, substantially all being smaller than about 10 microns in diameter and most being smaller than 5 microns in diameter.

Example 8 is my preferred composition and, when subjected to the heat treating schedule recited in Table II, yields an article which exhibits essentially no deformation and is very uniformly fine-grained. Also, when coated with a glaze having the following composition, in weight percent on the oxide basis and exhibiting a coefficient of thermal expansion of about $62 \times 10^{-7}$/° C., the article will demonstrate a modulus of rupture greater than 50,000 p.s.i.

|  | Percent |
|---|---|
| $SiO_2$ | 47.8 |
| PbO | 21.0 |
| $B_2O_3$ | 9.7 |
| CaO | 7.9 |
| $Al_2O_3$ | 7.3 |
| $Na_2O$ | 3.0 |
| $K_2O$ | 1.1 |
| $ZrO_2$ | 0.8 |
| CdO | 0.3 |
| $CaF_2$ | 1.1 |

I claim:

1. A glass-ceramic article exhibiting a coefficient of thermal expansion (25°–300° C.) between about $150$–$200 \times 10^{-7}$ and consisting essentially of fine-grained alpha-cristobalite crystals substantially uniformly dispersed in a glassy matrix, said crystals comprising the major proportion of the article and being formed through crystallization in situ from a glass body consisting essentially, by weight on the oxide basis, of about 10–25% PbO, 10–25% $Al_2O_3$, 35–65% $SiO_2$, and a nucleating agent selected from the group consisting of 6–12% $TiO_2$ and/or 3–10% $ZrO_2$+5–15% $P_2O_5$, the sum of $TiO_2$, $ZrO_2$, and $P_2O_5$ constituting no more than about 23% of the total composition.

References Cited

UNITED STATES PATENTS

| 2,691,855 | 10/1954 | Armistead | 106—39 DV |
| 2,920,971 | 1/1960 | Stookey | 106—39 DV |
| 3,586,522 | 6/1971 | Hoffman | 106—39 DV |

JAMES E. POER, Primary Examiner

M. L. BELL, Assistant Examiner

U.S. Cl. X.R.

106—53

UNITED STATES PATENT OFFICE
CERTIFICATE OF CORRECTION

PATENT NO. : 3,700,471
DATED : October 24, 1972
INVENTOR(S) : David A. Duke

It is certified that error appears in the above-identified patent and that said Letters Patent are hereby corrected as shown below:

Table II, Example 2, Heading Coeff. exp. (x $10^{-7}$/°C.), "6" should be -- 64 --

Signed and Sealed this thirtieth Day of September 1975

[SEAL]

Attest:

RUTH C. MASON
Attesting Officer

C. MARSHALL DANN
Commissioner of Patents and Trademarks